US009866411B1

(12) United States Patent
Song et al.

(10) Patent No.: US 9,866,411 B1
(45) Date of Patent: Jan. 9, 2018

(54) APPARATUS AND METHOD FOR SINGLE ANTENNA INTERFERENCE CANCELLATION (SAIC) ENHANCEMENT (71) Applicant: Samsung Electronics Co., Ltd., Gyeonggi-do (KR)

(72) Inventors: Kee-Bong Song, San Diego, CA (US); Hairuo Zhuang, San Diego, CA (US); Ming Yan, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/381,970

(22) Filed: Dec. 16, 2016

Related U.S. Application Data (60) Provisional application No. 61/411,336, filed on Oct. 21, 2016.

(51) Int. Cl.
*H04L 25/03* (2006.01)
*H04B 15/00* (2006.01)
(Continued)

(52) U.S. Cl.
CPC ....... *H04L 25/03057* (2013.01); *H04B 15/00* (2013.01); *H04L 1/0054* (2013.01); *H04L 25/067* (2013.01); *H04L 27/22* (2013.01)

(58) Field of Classification Search
USPC .......................... 375/267, 347, 229, 232, 219
See application file for complete search history.

(56) References Cited

U.S. PATENT DOCUMENTS 7,567,635 B2    7/2009   Scheim et al.
7,830,975 B2   11/2010   Kuchi et al.
(Continued)

FOREIGN PATENT DOCUMENTS

WO    WO 2007019681    2/2007

OTHER PUBLICATIONS

Meyer, Raimund et al., Efficient receivers for gsm muros downlink transmission, 2009 IEEE 20th, International Symposium on Personal, Indoor and Mobile Radio, Communications, Sep. 16, 2009, pp. 2399-2403, IEEE.

(Continued)

*Primary Examiner* — Eva Puente
(74) *Attorney, Agent, or Firm* — The Farrell Law Firm, P.C.

(57) ABSTRACT

An interference cancellation (IC) processor, a method, a method of manufacturing a semiconductor device, and a method of constructing an integrated circuit are provided. The IC processor includes a plurality of mono interference cancellation (MIC) filter estimation processors, each including a different equalizer offset $k_0$ and an input for receiving a de-rotated signal, and providing an effective channel $h_{res,i}$ and an estimated filter $p_i$; a plurality of filters, each including an input connected to the plurality of MIC filter estimation processors, and an output; a plurality of multipliers, each including a first input connected to the plurality of filters, a second input for receiving a weight, and an output; and a branch combiner including a plurality of inputs connected to the plurality of multipliers, a first output for providing a combined residual channel $H_{res}$, and a second output for providing a projected output y of the de-rotated signal.

20 Claims, 3 Drawing Sheets

(51) Int. Cl.
*H04L 25/06* (2006.01)
*H04L 1/00* (2006.01)
*H04L 27/22* (2006.01)

(56) References Cited

U.S. PATENT DOCUMENTS

| | | | |
|---|---|---|---|
| 7,924,933 B2 | 4/2011 | Prasad et al. | |
| 8,693,602 B2 | 4/2014 | Chevalier et al. | |
| 8,798,176 B2 | 8/2014 | Cairns et al. | |
| 2005/0232174 A1 | 10/2005 | Onggosanusi et al. | |
| 2007/0127608 A1 | 6/2007 | Scheim et al. | |
| 2010/0034241 A1* | 2/2010 | Krishnamurthy | H04L 25/03292 375/219 |
| 2010/0136940 A1 | 6/2010 | Hui et al. | |
| 2010/0322363 A1* | 12/2010 | Ghobrial | H04L 25/03885 375/347 |
| 2011/0021170 A1* | 1/2011 | Kolze | H04L 25/03019 455/296 |
| 2012/0027115 A1* | 2/2012 | Grant | H04B 1/7103 375/267 |
| 2012/0219051 A1* | 8/2012 | Yin | H04B 1/71072 375/229 |
| 2014/0241412 A1 | 8/2014 | Kalbasi et al. | |
| 2014/0355708 A1* | 12/2014 | Kang | H04B 1/12 375/267 |
| 2016/0269061 A1* | 9/2016 | Hwang | H04B 1/1036 |
| 2016/0294425 A1* | 10/2016 | Hwang | H04B 1/525 |
| 2017/0195143 A1* | 7/2017 | Chen | H04L 25/03006 |

OTHER PUBLICATIONS

Gerstacker, Wolfgang et al., GSM/EDGE: a mobile communications system determined to stay, International Journal of Electronics and Communications (AEU), Jan. 10, 2011, pgs Jan. 10, 2011, pp. 694-700.

Huang, Wenjie, et al., Widley Linear MIMO MMSE Filter and Joint MLSE for VAMOS, Thesis presented to the University of Waterloo, 2010, pp. 1-68, Waterloo, Ontario, Canada.

Kim, Kihong, Interference mitigation in wireless communications, Thesis presented to School of Electrical and Computer Engineering, Georgia Institure of Technology Aug. 23, 2005, pp. 1-134, ProQuest Information and Learning Company, Ann Arbor, MI.

Meyer, Raimund, et al., A Single Antenna Interference Cancellation Algorithm for Increased GSM Capacity, Jul. 2006, pp. 1616-1621 IEEE Transactions on Wireless Communications, vol. 5, No. 7.

G. David Forney, Jr., Maximum-Likelihood Sequence Estimation of Digital Sequences in the Presence of Intersymbol Interference IEEE Transactions on Information Theory, vol. IT-18, No. 3, May 1972.

* cited by examiner

APPARATUS AND METHOD FOR SINGLE ANTENNA INTERFERENCE CANCELLATION (SAIC) ENHANCEMENT

PRIORITY

This application claims priority under 35 U.S.C. §119(e) to a U.S. Provisional Patent Application filed in the USPTO on Oct. 21, 2016 and assigned Ser. No. 62/411,336, the entire contents of which are incorporated herein by reference.

FIELD

The present disclosure relates generally to communication technology, and more particularly, to an apparatus and method for single antenna interference cancellation (SAIC).

BACKGROUND

In a communication network (e.g., a second generation (2G) Global System for Mobile Communications (GSM) network), system capacity is often limited by co-channel interference (CCI) due to channel re-use.

GSM uses a combination of time division multiple access (TDMA) and frequency division multiple access (FDMA). Gaussian minimum shift keying (GMSK) modulation is used in GSM such that unwanted or spurious emissions outside the nominal bandwidth are sufficiently low to enable adjacent channels to be used from the same base station.

Data transported by a carrier provides up to eight different users by splitting the carrier into eight time slots, using a TDMA scheme. This enables different users of a single radio frequency (RF) channel to be allocated in different time slots. Different users are then able to use the same RF channel without mutual interference. A GSM burst is a transmission made in a time slot, where a burst includes three tail bits at the start of the GSM burst to provide time for a transmitter to ramp up its power, 57 data bits used to carry information, one flag bit to indicate the type of data in the previous field, 26 bits for a training sequence (TS) that is used as a timing reference and for equalization, 1 flag bit to indicate the type of data in the data field, 57 bits of data, 3 tail bits to allow time for a transmitter to ramp down its power, and 8.25 bits to provide a guard time at the end of a GSM burst.

A basic GSM receiver simply treats CCI as additive white Gaussian noise (AWGN), thus resulting in inferior performance. Unlike white Gaussian noise, which is uncorrelated in both time and space, interference typically has a strong correlation in time and space, i.e., the interference is colored. In a wireless communication system with multiple receive antennas, interference may be mitigated through an interference whitening technique, which exploits the correlation of a received signal among multiple receive antennas. Since a GSM system typically uses only a single receive antenna, an interference whitening technique cannot be directly applied. However, a GMSK signal may be approximated by a binary phase shift keying (BPSK) signal with consecutive 90 degree phase rotations. If I and Q are treated as two signal dimensions, BPSK is a one dimensional signal, unlike quadrature phase shift keying (QPSK) and other quadrature amplitude modulation (QAM) schemes that occupy both I and Q dimensions. Therefore, for BPSK or GSMK signals, even with a single receive antenna, it is feasible to perform interference suppression through certain signal space projection, which is commonly referred to as SAIC.

SUMMARY

According to one embodiment, an interference cancellation (IC) processor includes a plurality of mono interference cancellation (MIC) filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$; a plurality of filters, wherein each of the plurality of filters includes an input connected to the output of one of the plurality of MIC filter estimation processors, and an output; a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal.

According to one embodiment, a method of combining channels of a de-rotated signal by an IC processor includes generating an effective channel $h_{res,i}$ and an estimated filter $p_i$ by each of a plurality of MIC filter estimation processors, wherein each of the plurality of MIC filter estimation processors includes a different equalizer offset $k_0$ and includes an input connected to a first input of the IC processor for receiving a de-rotated signal; filtering, by a plurality of filters, the generating effective channels $h_{res,i}$ of each of the plurality of MIC filter estimation processors; multiplying, by a plurality of multipliers, each of the filtered effective channels $h_{res,i}$ of the plurality of filters by one of a plurality of weights; and generating, by a branch combiner, a combined residual channel $H_{res}$ and a projected output y of the de-rotated signal.

According to one embodiment, a method of manufacturing a semiconductor device includes forming the semiconductor device as part of a wafer or package that includes a plurality of MIC filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$; a plurality of filters, wherein each of the plurality of filters includes an input connected to the output of one of the plurality of MIC filter estimation processors, and an output; a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal; and testing the semiconductor device, wherein testing of the semiconductor device is performed using at least one electrical to optical converter, at least one optical splitter that splits an optical signal into at least two optical signals, and at least one optical to electrical converter.

According to one embodiment, a method of constructing an integrated circuit includes generating a mask layout for a set of features for a layer of the integrated circuit, the mask layout having standard cell library macros for a plurality of MIC filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$; a plurality of filters, wherein each of the plurality of filters includes an input connected to the output of one of the plurality of MIC filter estimation processors, and an output; a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal; disregarding relative positions of the macros for layout design rule compliance during generation of the mask layout; monitoring the relative positions of the macros for layout design rule compliance after disregarding the relative positions; upon detection of layout design rule noncompliance of the macros, generating an adapted mask layout by adapting the noncompliance macros for layout design rule compliance; generating a mask according to the adapted layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

According to one embodiment, the present system and method provides SAIC to improve the performance of enhanced data rates for GSM evolution (EDGE), if the desired signal is 8PSK modulated and the interferences are GMSK modulated. The present system and method decomposes the spatial and temporal interference whitening issue into multiple least square issues, where each multiple least square issue (referred to as a branch) is formulated with different equalizer delays and different constraints on the residue channel.

According to one embodiment, the branches are weight combined based on a mean squared error (MSE) of least square solutions before the branches are provided for maximum likelihood sequence estimation (MLSE) processing. By choosing a different main tap in left/right burst processing, the need to calculate a minimum/maximum phase filter prior to MLSE processing is eliminated.

According to one embodiment, a desired signal may be 8PSK modulated and interference may be GMSK modulated. It is understood that the desired signal and interference may be extended to other types, without deviating from the scope of the present disclosure. It is assumed that the channel length is L+1 in chipx1 (i.e., oversampling rate of 1). For single GMSK interference, the received signal may be expressed as in Equation (1) as follows:

$$\tilde{r}[t] = \sum_{l=0}^{L} \tilde{h}[l]a[t-l]e^{j\phi(t-1)} + \underbrace{\sum_{m=0}^{L} \tilde{g}[m]b[t-m]e^{j\theta(t-m)} + \tilde{w}[t]}_{\tilde{n}[t]} \quad (1)$$

where a[t] is 8PSK modulated and its phase rotation $$\phi = \frac{3\pi}{8}, b[t]$$

is GMSK modulated and its phase rotation $$\theta = \frac{\pi}{2}, \tilde{r}[t]$$

is a received signal before phase de-rotation, L is a number of channel taps minus 1, h̃[l] is a channel of a user, g̃[m] is a channel of an interference user, and w̃[t] is noise and other interference.

For SAIC processing, because the interference is assumed to be GMSK modulated, phase de-rotation of $$\theta = \frac{\pi}{2}$$

must be performed, i.e., as in Equation (2) as follows:

$$r[t] = \tilde{r}[t]e^{-j\theta t} = \sum_{l=0}^{L} \tilde{h}[l]e^{-j\theta l}a[t-l]e^{j(\varphi-\theta)(t-l)} + \sum_{m=0}^{L} \tilde{g}[m]e^{-j\theta m}b[t-m] + \tilde{w}[t]e^{-j\theta t} \quad (2)$$

where r[t] is a received signal after de-rotation.

Thus, Equation (3) is as follows:

$$\tilde{r}[t] = \sum_{l=0}^{L} h[l]\tilde{a}[t-l] + \underbrace{\sum_{m=0}^{L} g[m]b[t-m] + w[t]}_{n[t]} \quad (3)$$

where ã[t]=a[t]$e^{j(\varphi-\theta)t}$, ā[t] is an equivalent transmit signal after phase de-rotation, h[l]=h̃[l]$e^{-j\theta l}$, h[l] is an equivalent channel of a user after phase de-rotation, g[m]=g̃[m]$e^{-j\theta m}$, g[m] is an equivalent channel of an interference user after phase de-rotation, w[t]=w̃[t]$e^{-j\theta t}$, and w[t] is noise and other interference after phase de-rotation.

The effective transmitted symbol ã[t] is $$\frac{\pi}{8}$$

rotated, and the training symbol part a[t] is still a BPSK (±1) signal even for 8PSK. However, ã[t] is a complex signal due to the consecutive $$\frac{\pi}{8}$$

rotation.

The above complex signal model can be rewritten as an intersymbol interference (ISI) MIMO model with all real components as in Equation (4) as follows:

$$\begin{bmatrix} r_I[t] \\ r_Q[t] \end{bmatrix} = \sum_{l=0}^{L} \begin{bmatrix} h_I[l] & -h_Q[l] \\ h_Q[l] & h_I[l] \end{bmatrix} \begin{bmatrix} \tilde{a}_I[t-l] \\ \tilde{a}_Q[t-l] \end{bmatrix} + \begin{bmatrix} n_I[t] \\ n_Q[t] \end{bmatrix} \quad (4)$$

where $r_I[t]$ and $h_I[l]$ are real parts of an imaginary signal, and $r_Q[t]$ and $g_Q[l]$ are imaginary parts of a complex signal.

More generally, multiple receive antennas may be taken into account by oversampling (e.g., 2× samples per symbol time). Thus, Equation (5) may be defined as follows:

$$r[t] = \sum_{l=0}^{L} H[l] \begin{bmatrix} \tilde{a}_I[t-l] \\ \tilde{a}_Q[t-l] \end{bmatrix} + n[t] \quad (5)$$

where H[l] is M×2 matrix. r[t] and n[t] are M×1 vector, M=2×number of Rx×oversampling rate. For a single antenna with oversample rate 2, M=4.

In matrix form, by concatenating $Q_p$ chipx1 consecutive time samples, Equation (6) may be defined as follows:

$$r_t = Ha_t + n_t \quad (6)$$

The channel matrix of $M(1+Q_p) \times 2(1+Q_p+L)$ is as expressed in Equation (7) as follows:

$$H := \begin{bmatrix} H[0] & \cdots & H[L] & 0 & \cdots & 0 \\ 0 & H[0] & \cdots & H[L] & \cdots & 0 \\ \vdots & \ddots & \ddots & \cdots & \ddots & \vdots \\ 0 & \cdots & 0 & H[0] & \cdots & H[L] \end{bmatrix} \quad (7)$$

A received vector of $M(1+Q_p) \times 1$: $r_t := [r[t]^T \ r[t-1]^T \ \ldots \ r[t-Q_p]^T]^T$ A transmitted vector of $2(1+Q_p+L) \times 1$: $a_t := [\tilde{a}_I[t] \ \tilde{a}_Q[t] \ \ldots \ \tilde{a}_I[t-L-Q_p] \ \tilde{a}_Q[t-L-Q_p]]^T$ An interference vector of $M(1+Q_p) \times 1$: $n_t := [n[t]^T \ n[t-1]^T \ \ldots \ n[t-Q_p]^T]^T$ According to one embodiment, MMIC may be referred to as a temporal interference whitening (IW) operation followed by a spatial IW operation.

The present system may perform temporal IW to decompose the issue into multiple least square (LS) issues, where each issue corresponds to a branch, and where each branch is formulated by solving Equation (8) as follows:

$$\min_{p, h_{res}} \sum_{t \in TS} (p^T r_t - h_{res}^T a_{t-k_0})^2 \quad (8)$$

where $k_0$ is some given equalizer delay. $h_{res}$ is of length $2(Q_d+1)$, and p is of length $M(Q_p+1)$. To avoid an all zero trivial solution, a constraint must be imposed on either $h_{res}$ or p. Imposing constraints on $h_{res}$ generally results in better performance than imposing constraints on p.

For example, when constructing 8 branches, $k_0=1, 2, 3$ and 4 may be selected. In a GMSK case, the length of $h_{res}$ may be $(Q_d+1)$. In this case, for 8PSK formulation, the length of $h_{res}$ may be $2(1+Q_d)$. Thus, for each τ, $h_{res}[0]=1$ (corresponding to a real part of a complex channel) or $h_{res}[1]=1$ (corresponding to an imaginary part of of a complex channel) may be constrained.

Eight branches may be formulated, where each branch corresponds to the solution of the LS issue in Equation (9) as follows:

$$\min_{p, h_{res}: h_{res}[n]=1, } \sum_{t \in TS} (p^T r_t - h_{res}^T a_{t-k_0})^2 \tag{9}$$

where τ=1, 2, 3 or 4, and n=0 or 1.

More generally, by choosing different $k_0$ and a different constraint on $h_{res}$, a B number of branches may be formulated as in Equations (10)-(12) as follows:

$$p_1^T r_t = h_{res,1}^T a_{t-k_{0,1}} + e_1[t-k_{0,1}] \tag{10}$$

$$p_2^T r_t = h_{res,2}^T a_{t-k_{0,2}} + e_2[t-k_{0,2}] \tag{11}$$

...

$$p_B^T r_t = h_{res,B}^T a_{t-k_{0,B}} + e_B[t-k_{0,B}] \tag{12}$$

By properly shifting with $k_{0,1}, \ldots, k_{0,B}$, the following in Equations (13)-(15) is obtained:

$$y_1[t] := p_1^T r_{t+k_{0,1}} = h_{res,1}^T a_t + e_1[t] \tag{13}$$

$$y_2[t] := p_2^T r_{t+k_{0,2}} = h_{res,2}^T a_t + e_2[t] \tag{14}$$

$$y_B[t] := p_B^T r_{t+k_{0,B}} = h_{res,B}^T a_t + e_2[t] \tag{15}$$

By defining $$H_{res,T} := \begin{bmatrix} h_{res,1}^T \\ h_{res,2}^T \\ \vdots \\ h_{res,B}^T \end{bmatrix}, P_T := \begin{bmatrix} p_1^T \\ p_2^T \\ \vdots \\ p_B^T \end{bmatrix}, e_T[t] := \begin{bmatrix} e_1[t] \\ e_2[t] \\ \vdots \\ e_B[t] \end{bmatrix},$$

and $$y_T[t] := \begin{bmatrix} y_1[t] \\ y_2[t] \\ \vdots \\ y_B[t] \end{bmatrix},$$

Equation (16) as follows may be compactly written:

$$y_T[t] = H_{res,T} a_t + e_r[t] \tag{16}$$

After performing temporal IW, the present system may further perform a spatial IW based on a spatial covariance of a residue error. More specifically, B×B IW matrix $P_S = R_{ee}^{-1/2}$ is selected, where $R_{ee}$ may be estimated by training symbols as in Equation (17) as follows:

$$R_{ee} = E[e_T[t]e_T[t]^T] \approx \frac{\sum_{t \in TS}(y_T[t] - H_{res,T}a_t)(y_T[t] - H_{res,T}a_t)^T}{|TS|} \tag{17}$$

After spatial IW, Equation (18) is expressed as follows:

$$y[t] := P_S y_T[t] = P_S H_{res,T} a_t + P_S e_T[t] = H_{res} a_t + e[t] \tag{18}$$

where $H_{res} := P_S H_{res,T}$ and $e[t] = P_S e_T[t]$.

The dimension of $H_{res}$ is B×2(1+$Q_d$). $H_{res}$ may be rewritten as $H_{res} = [H_{res}[0] \ H_{res}[1] \ldots H_{res}[Q_d]]$, where $H_{res}[l]$ is a B×2 real matrix. Then, Equation (18) above may be rewritten as Equation (19) as follows:

$$y[t] = \sum_{l=0}^{Q_d} H_{res}[l] \begin{bmatrix} \tilde{a}_I[t-l] \\ \tilde{a}_Q[t-l] \end{bmatrix} + e[t] \tag{19}$$

According to one embodiment, the present system approximates $R_{ee}$ as a diagonal matrix by ignoring off-diagonal elements, i.e., as in Equation (20) as follows:

$$R_{ee} \approx \begin{bmatrix} \hat{\sigma}_1^2 & \cdots & 0 \\ \vdots & \ddots & \vdots \\ 0 & \cdots & \hat{\sigma}_B^2 \end{bmatrix} \tag{20}$$

where $$\hat{\sigma}_i^2 = \frac{\sum_{t \in TS}(p_i^T r_t - h_{res,i}^T a_{t-k_{0,i}})^2}{|TS|}.$$

Then, Equation (21) may be expressed as follows:

$$P_S = R_{ee}^{-1/2} = \begin{bmatrix} w_1 & \cdots & 0 \\ \vdots & \ddots & \vdots \\ 0 & \cdots & w_B \end{bmatrix} \tag{21}$$

where $w_i = 1/\hat{\sigma}_i$.

With this simplification, the spatial IW is reduced to simple component-wise scaling as in Equation (22) as follows:

$$H_{res} = \begin{bmatrix} w_1 h_{res,1}^T \\ w_2 h_{res,2}^T \\ \vdots \\ w_B h_{res,B}^T \end{bmatrix}, = \begin{bmatrix} w_1 p_1^T \\ w_2 p_2^T \\ \vdots \\ w_B p_B^T \end{bmatrix}, \tag{22}$$

$$e[t] = \begin{bmatrix} w_1 e_1[t] \\ w_2 e_2[t] \\ \vdots \\ w_B e_B[t] \end{bmatrix}, \text{ and } y[t] = \begin{bmatrix} w_1 y_1[t] \\ w_2 y_2[t] \\ \vdots \\ w_B y_B[t] \end{bmatrix}$$

This scaling operation may be viewed as a simplified post-MIC IW process where only the power scaling is performed. In particular, it is assumed that the residual error across different branch outputs are uncorrelated, which may not be necessarily true in practice. However, it is found that the performance gap between using simple scaling and using full spatial IW is quite small.

In a case where a suboptimal MLSE algorithm (e.g. decision feedback sequence estimation (DFSE), reduced state sequence estimation (RSSE)) is used instead of a full MLSE, it may be better to process a burst in two parts: process the left part of the burst from training symbols from the middle to the left, and process the right part of the burst from the training symbols from the middle to the right.

For non-SAIC processing, a minimum phase filter is applied to right burst processing to concentrate channel tap energy to the earliest tap, which may provide better confidence in the sequence estimation algorithm. Likewise, a maximum phase filter may be applied to left burst processing to concentrate tap channel tap energy to a latest tap due to the reversed order in MLSE processing.

For SAIC processing with MMIC, a similar purpose may be achieved without having to find the minimum/maximum phase filters. It may be done by choosing a main-tap differently for a left/right burst. For a right burst, the present system may use the 0-th tap as the main-tap. For 8PSK, the 0-th tap corresponds to the first two components (real and imaginary) of $h_{res}$. That is, the present system constrains either $h_{res}[0]=1$ or $h_{res}[1]=1$ in Equation (8) above. For the left burst, the $Q_d$-th tap is used as the main-tap. That is, the present system constrains either $h_{res}[2Q_p]=1$ or $h_{res}[2Q_p+1]=1$ in Equation (8) above.

Assuming the residue error e[t] is an independent identically distributed (i.i.d.) AWGN process, then by adopting Forney's MLSE approach, maximum likelihood sequence estimation may be formulated as in Equation (23) as follows:

$$\mathop{\text{argmin}}_{\tilde{a}} \sum_t \left\| y[t] - \sum_{l=0}^{Q_d} H_{res}[l] \begin{bmatrix} \tilde{a}_I[t-l] \\ \tilde{a}_Q[t-l] \end{bmatrix} \right\|^2 \quad (23)$$

Since $\tilde{a}[t]=\tilde{a}_I[t]+j\tilde{a}_Q[t]=a[t]e^{j(\varphi-\theta)t}$ may be $$\frac{\pi}{8}$$

phase-rotated 8PSK signal, the constellation may be time-varying with a period of 16 chipx1 samples. If Equation 24 below is implemented in its naïve form, it would require implementing the Viterbi algorithm with a time-varying trellis state, which would require significant complexity. To avoid this, the following equation may be expressed as in Equation (24) as follows:

$$\begin{bmatrix} \tilde{a}_I[t] \\ \tilde{a}_Q[t] \end{bmatrix} = U[t] \begin{bmatrix} a_I[t] \\ a_Q[t] \end{bmatrix} \quad (24)$$

where U[t] is a 2×2 rotation matrix, defined by Equation (25) as follows:

$$U[t] = \begin{bmatrix} \cos(\phi-\theta)t & -\sin(\phi-\theta)t \\ \sin(\phi-\theta)t & \cos(\phi-\theta)t \end{bmatrix} \quad (25)$$

For a rotation matrix, the property in Equation (26) as follows applies:

$$U[a+b]=U[a]U[b] \quad (26)$$

Thus, Equation (27) is as follows:

$$\sum_{l=0}^{Q_d} H_{res}[l] \begin{bmatrix} \tilde{a}_I[t-l] \\ \tilde{a}_Q[t-l] \end{bmatrix} = \sum_{l=0}^{Q_d} H_{res}[l] U[t-l] \begin{bmatrix} a_I[t-l] \\ a_Q[t-l] \end{bmatrix} =$$

$$\sum_{l=0}^{Q_d} H_{res}[l] U[-l] U[t] \begin{bmatrix} a_I[t-l] \\ a_Q[t-l] \end{bmatrix} = \sum_{l=0}^{Q_d} \tilde{H}_{res}[l] U[t] \begin{bmatrix} a_I[t-l] \\ a_Q[t-l] \end{bmatrix} \quad (27)$$

where $\tilde{H}_{res}[l]=H_{res}[l]U[-l]$.

To handle U[t], Equation (28) is as follows:

$$U[t] \begin{bmatrix} a_I[t-l] \\ a_Q[t-l] \end{bmatrix} = \begin{bmatrix} a_I[t-l] & -a_Q[t-l] \\ a_Q[t-l] & a_I[t-l] \end{bmatrix} \begin{bmatrix} \cos(\phi-\theta)t \\ \sin(\phi-\theta)t \end{bmatrix} \quad (28)$$

A[t] is defined in Equation (29) as follows:

$$A[t] = \begin{bmatrix} a_I[t] & -a_Q[t] \\ a_Q[t] & a_I[t] \end{bmatrix} \quad (29)$$

Thus, Equation (30) is as follows:

$$\sum_{l=0}^{Q_d} H_{res}[l] \begin{bmatrix} \tilde{a}_I[t-l] \\ \tilde{a}_Q[t-l] \end{bmatrix} = \left( \sum_{l=0}^{Q_d} \tilde{H}_{res}[l] A[t-l] \right) \begin{bmatrix} \cos(\phi-\theta)t \\ \sin(\phi-\theta)t \end{bmatrix} \quad (30)$$

Equation (23) above is equivalent to Equation (31) as follows:

$$\min_a \sum_t \left\| y[t] - \left( \sum_{l=0}^{Q_d} \tilde{H}_{res}[l] A[t-l] \right) \begin{bmatrix} \cos(\phi-\theta)t \\ \sin(\phi-\theta)t \end{bmatrix} \right\|^2 \quad (31)$$

which does not involve a time-varying constellation. Instead there is a time varying multiplication term $$\begin{bmatrix} \cos(\phi-\theta)t \\ \sin(\phi-\theta)t \end{bmatrix}.$$

This may result in a simplification of an implementation and much less modification to existing code of a non-SAIC MLSE equalizer. Equation (31) above may be referred to as a phase-rotated MLSE. Equation (31) above may be represented by using complex signal notation.

$h_c[l]$ may be a complex channel vector whose real part is the first column of $H_{res}[l]$ and whose imaginary part is the negative of the second column of $H_{res}[l]$. Similarly, $\tilde{h}_c[l]$ may be the complex channel vector whose real part is the first column of $\tilde{H}_{res}[l]$ and whose imaginary part is the negative of the second column of $\tilde{H}_{res}[l]$, then Equation (32) is as follows $$\tilde{H}_{res}[l]=H_{res}[l]U[-l] \quad (32)$$

and is equivalent to Equation (33) as follows:

$$\tilde{h}_c[l]=e^{j(\varphi-\theta)l}h_c[l] \quad (33)$$

Thus, Equation (34) is as follows:

$$\sum_{l=0}^{Q_d} H_{res}[l] \begin{bmatrix} \tilde{a}_I[t-l] \\ \tilde{a}_Q[t-l] \end{bmatrix} = \text{Re}\left\{ \sum_{l=0}^{Q_d} h_c[l]\tilde{\alpha}[t-l] \right\} = \qquad (34)$$

$$\text{Re}\left\{ \sum_{l=0}^{Q_d} h_c[l]a[t-l]e^{j(\phi-\theta)(t-l)} \right\} = \text{Re}\left\{ e^{j(\phi-\theta)t} \sum_{l=0}^{Q_d} \tilde{h}_c[l]a[t-l] \right\}$$

Equation (31) above is equivalent to Equation (35) as follows:

$$\min_a \sum_t \left\| y[t] - \text{Re}\left\{ e^{j(\phi-\theta)t} \sum_{l=0}^{Q_d} \tilde{h}_c[l]a[t-l] \right\} \right\|^2 \qquad (35)$$

where both $\tilde{h}_c[l]$ and a[t] are complex valued. Since $$\phi - \theta = -\frac{\pi}{8}$$

and a[t] is a 8PSK constellation in the form of $$e^{j\frac{\pi}{4}k}$$

(k=0, . . . , 7), actual time-varying complex multiplication does not have to be performed.

In practice, $\Sigma_{l=0}^{Q_d}\tilde{h}_c[l]a[t-l]$ is implemented in the form of a lookup table (LUT); the present system may generate two LUTs, $LUT_0 = \{\Sigma_{l=0}^{Q_d}\tilde{h}_c[l]a[t-l]\}$ and $$LUT_1 = \left\{ e^{j\frac{\pi}{8}} \sum_{l=0}^{Q_d} \tilde{h}_c[l]a[t-l] \right\}.$$

For even time samples (t=0, 2, 4, . . . ), the present system may use $LUT_0$ with a time-varying state index mapping. For odd time samples (t=1, 3, 5, . . . ), the present system may use $LUT_1$ with a time-varying state index mapping. FIG. 12 described below illustrates a block diagram of the present MMIC system, according to one embodiment. The present system and method improves the 8PSK performance in case of CCI being GMSK modulated.

Figure 1:
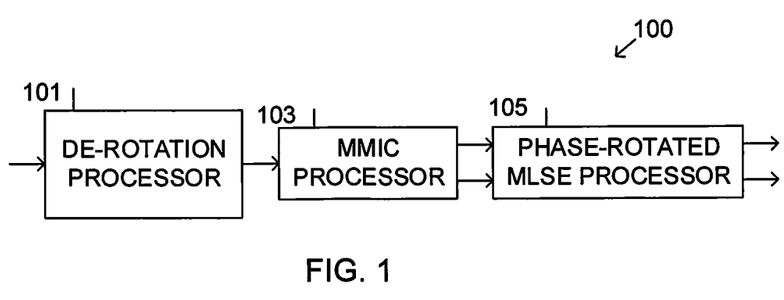
FIG. 1 is a block diagram of a GSM receiver, according to an embodiment of the present disclosure.

FIG. 1 is a block diagram of a GSM receiver 100, according to an embodiment of the present disclosure.

Referring to FIG. 1, the GSM receiver 100 includes a phase shift keying (PSK) signal de-rotation processor 101, an MMIC processor 103, and a phase-rotated MLSE processor 105. In an embodiment of the present disclosure, the PSK signal de-rotation processor 101, the MMIC processor 103, and the phase-rotated MLSE processor 105 may be included in one processor (e.g., a digital signal processor (DSP)) or may each be realized in more than one processor.

The PSK signal de-rotation processor 101 includes an input for receiving a PSK signal, and an output. The PSK signal de-rotation processor 101 approximates the received signal as a BPSK signal with consecutive 90 degree phase rotations.

The MMIC processor 103 includes an input connected to the output of the PSK signal de-rotation processor 101, a first output, and a second output. The input of the MMIC processor 103 receives a BPSK approximation of the received signal from the PSK signal de-rotation processor 101. The first output of the MMIC processor 103 provides a combination of residual channels associated with the received signal approximated as a BPSK signal. The second output of the MMIC processor 103 provides a projected output of the received PSK signal approximated as a BPSK signal.

The phase-rotated MLSE processor 105 includes a first input connected to the first output of the MMIC processor 103, a second input connected to the second output of the MMIC processor 103, a first output, and a second output. The first input of the phase-rotated MLSE processor 105 receives the combination of the residual channels from the MMIC processor 103. The second input of the phase-rotated MLSE processor 105 receives the filtered BPSK approximation of the received signal from the MMIC processor 103. The first output of the phase-rotated MLSE processor provides a hard decision associated with an ISI-removed filtered output of the MMIC processor 103. The second output of the phase-rotated MLSE processor 105 provides a soft decision associated with the ISI-removed filtered output of the MMIC processor 103.

Figure 2:
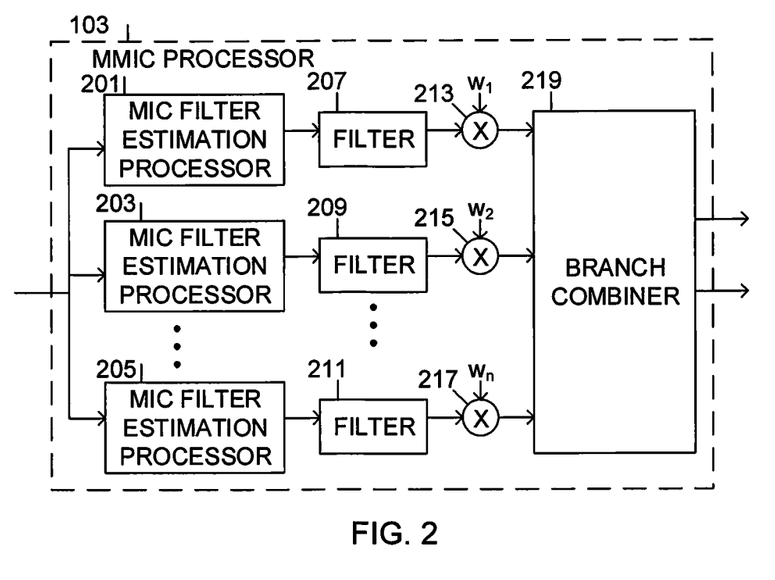
FIG. 2 is a block diagram of a multiple input multiple output (MIMO) MIC (MMIC) processor of FIG. 1, according to an embodiment of the present disclosure.

FIG. 2 is a block diagram of the MMIC processor 103 of FIG. 1, according to an embodiment of the present disclosure.

Referring to FIG. 2, the MMIC processor 103 includes a plurality of MIC filter estimation processors 201, 203, and 205, a plurality of filters 207, 209, and 211 corresponding to the plurality of MIC filter estimation processors 201, 203, and 205, a plurality of multipliers 213, 215, and 217 corresponding to the plurality of filters 207, 209, and 211, and a branch combiner 219. FIG. 2 illustrates three of each of the plurality of MIC filter estimation processors 201, 203, and 205, the plurality of filters 207, 209, and 211, and the plurality of multipliers 213, 215, and 217. However, the present disclosure is not limited to using three each of these components, but may use any number of each of these components.

Each MIC filter estimation processor 201, 203, and 205, or virtual channel, is referred to as a branch, and is formulated by choosing a different equalizer delay $k_0$ for each branch. Each MIC filter estimation processor 201, 203, and 205, or virtual channel, includes an input connected to the output of the de-rotation processor 101, an output for outputting a residual channel $h_i$ and an estimated filter $p_i$ for the corresponding branch.

Each input of the plurality of filters 207, 209, and 211, includes an input connected to the output of one of the plurality of MIC filter estimation processors 201, 203, and 205, and an output.

Each of the plurality of multipliers 213, 215, and 217 includes a first input connected to the output of one of the plurality of filters 207, 209, and 211, a second input for receiving a weight $w_1, w_2, \ldots, w_n$ corresponding to one of the plurality of MIC filter estimation processors 201, 203, and 205 to which each of the plurality of multipliers 213, 215, and 217 are connected to via the plurality of filters 207, 209, and 211, and an output.

The branch combiner 219 includes a plurality of inputs connected to the outputs of the plurality of multipliers 213, 215, and 217, a first output for providing a combined combined residual channel $H_{res}$, and a second output for providing a projected output y.

Figure 3:
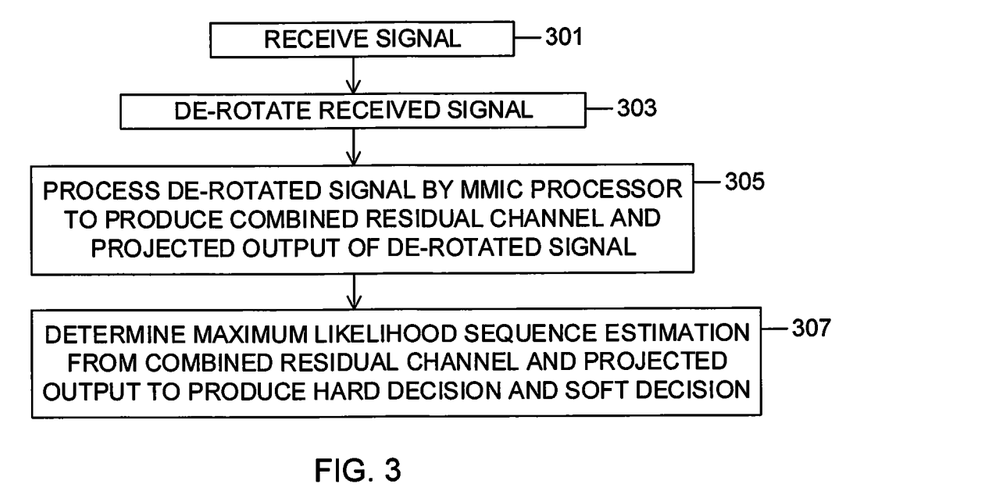
FIG. 3 is a flowchart of a method of SAIC enhancement in a GSM user equipment (UE) receiver, according to an embodiment of the present disclosure.

FIG. 3 is a flowchart of a method of SAIC enhancement in a GSM UE receiver, according to an embodiment of the present disclosure.

Referring to FIG. 3, a PSK signal is received at 301.

At 303, the received PSK signal is de-rotated by a de-rotation processor.

At 305, the de-rotated PSK signal is processed by an MMIC processor to produce a combined residual channel and a projected output of the de-rotated PSK signal.

At 307, the combined residual channel and the filtered output are processed by a phase-rotated MLSE processor to produce a hard decision output and a soft decision output.

Figure 4:
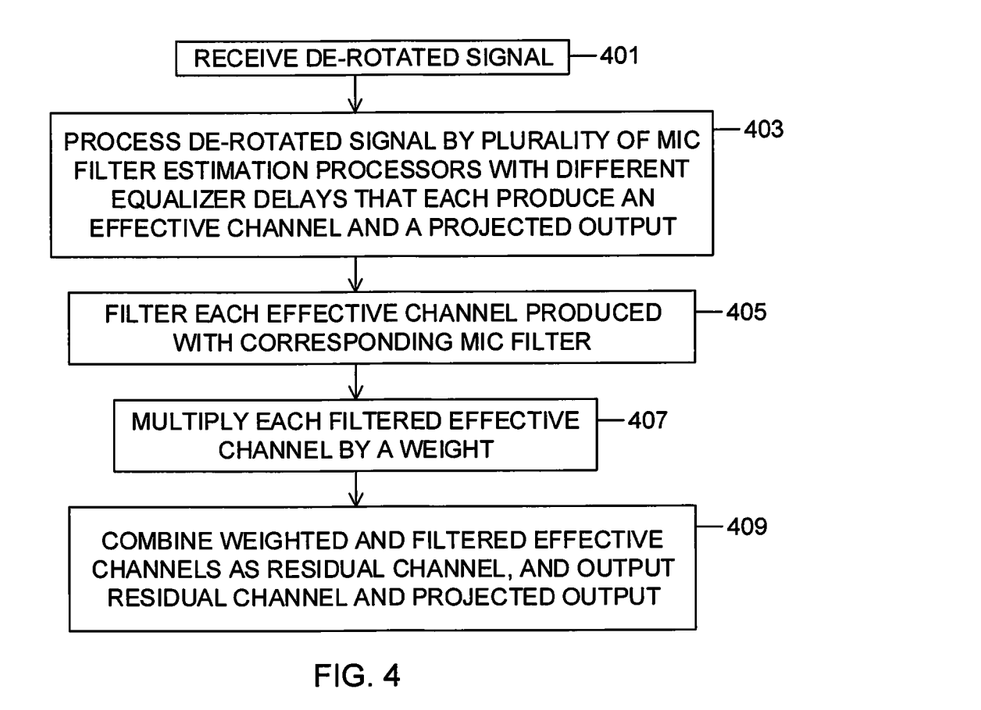
FIG. 4 is a flowchart of a method of the MMIC processor of FIG. 2, according to an embodiment of the present disclosure.

FIG. 4 is a flowchart of a method of the MMIC processor 103 of FIG. 1, according to an embodiment of the present disclosure.

Referring to FIG. 4, the MMIC processor 103 receives a de-rotated signal at 401.

At 403, the de-rotated signal is processed by a plurality of MIC filter estimation processors (e.g., MIC filter estimation processors 201, 203, and 205 of FIG. 2), or branches, where each branch is formulated by choosing a different equalizer delay $k_0$ for each branch, outputs an effective channel $h_{res,i}$ for the corresponding branch, and outputs an estimated filter $p_i$ for the corresponding branch. For example, three branches may be formulated as expressed in Equations (10)-(12) above.

At 405, the effective channel $h_{res,i}$ of each of the branches is filtered by a filter.

At 407, each filtered effective channel is multiplied by a weight by a multiplier.

At 409, the weighted and filtered effective channels are combined to produce a residual channel and a projected output of the received signal.

Figure 5:
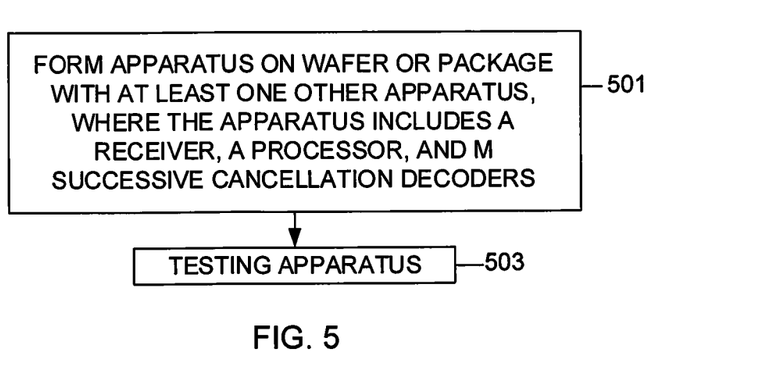
FIG. 5 is a flowchart of a method of manufacturing an IC processor, according to an embodiment of the present disclosure.

FIG. 5 is a flowchart of a method of manufacturing a semiconductor device, according to an embodiment of the present disclosure.

Referring to FIG. 5, the semiconductor device is formed on a wafer or a package with at least one semiconductor device, where the semiconductor device includes a plurality of MIC filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$; a plurality of filters, wherein each of the plurality of filters includes an input connected to the output of one of the plurality of MIC filter estimation processors, and an output; a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal at 501.

At 503, the functionality of the semiconductor device is tested. Testing the semiconductor device includes testing the semiconductor device using one or more electrical to optical converters, one or more optical splitters that split an optical signal into two or more optical signals, and one or more optical to electrical converters.

Figure 6:
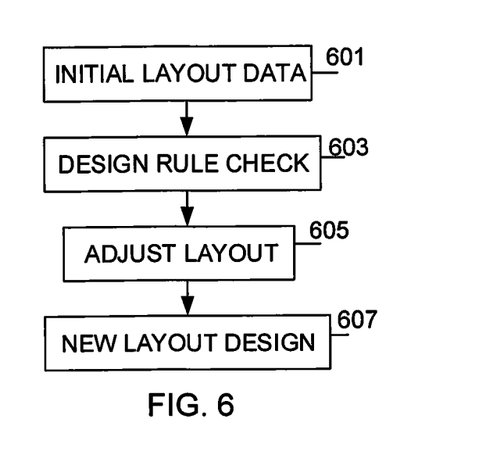
FIG. 6 is a flowchart of constructing an integrated circuit, according to an embodiment of the present disclosure.

FIG. 6 is a flowchart of constructing an integrated circuit, according to an embodiment of the present disclosure.

Referring to FIG. 6, initial layout data is constructed in 601. For example, a mask layout is generated for a set of features for a layer of the integrated circuit, wherein the mask layout includes standard cell library macros for one or more circuit features that include a plurality of MIC filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$; a plurality of filters, wherein each of the plurality of filters includes an input connected to the output of one of the plurality of MIC filter estimation processors, and an output; a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal, and disregarding relative positions of the macros for compliance to layout design rules during the generation of the mask layout.

At 603, a design rule check is performed. For example, the method may check the relative positions of the macros for compliance to layout design rules after generating the mask layout.

At 605, the layout is adjusted. For example, the method, upon detection of noncompliance with the layout design rules by any of the macros, may modify the mask layout by modifying each of the noncompliant macros to comply with the layout design rules.

At 607, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An interference cancelation (IC) processor, comprising:
a plurality of mono interference cancellation (MIC) filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$;
a plurality of filters, wherein each of the plurality of filters includes an input connected to the output of one of the plurality of MIC filter estimation processors, and an output;
a plurality of multipliers, wherein each of the plurality of multipliers includes a first input connected to the output of one of the plurality of filters, a second input for receiving a weight, and an output; and
a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal.

2. The IC processor of claim 1, further comprising a de-rotation processor configured to de-rotate a received signal, including an input for receiving a signal, and an output connected to the input of the IC processor.

3. The IC processor of claim 1, further comprising a phase-rotated maximum-likelihood sequence estimation (MLSE) processor, including a first input connected to the first output of the IC processor, a second input connected to the second output of the IC processor, a first output for providing a hard decision of the combined residual channel $H_{res}$ and the projected output y, and a second output for providing a soft decision of the combined residual channel $H_{res}$ and the projected output y.

4. The IC processor of claim 2, wherein the received signal is phase shift keying (PSK) modulated that includes interference that is Gaussian minimum shift keying (GMSK) modulated.

5. The IC processor of claim 2, wherein the de-rotation processor is further configured to phase de-rotate the received signal by $$\theta = \frac{\pi}{2}$$

as follows:

$$r[t] = \tilde{r}[t]e^{-j\theta t} = \sum_{l=0}^{L}\tilde{h}[l]e^{-j\theta l}a[t-l]e^{j(\varphi-\theta)(t-l)} + \sum_{m=0}^{L}\tilde{g}[m]e^{-j\theta m}b[t-m] + \tilde{w}[t]e^{-j\theta t}, \text{ wherein}$$

$$r[t] = \sum_{l=0}^{L} h[l]\tilde{a}[t-l] + \underbrace{\sum_{m=0}^{L} g[m]b[t-m] + w[t]}_{n[t]},$$

wherein
$\tilde{a}[t]=a[t]e^{j(\varphi-\theta)t}$, $h[l]=\tilde{h}[l]e^{-j\theta l}$, $g[m]=\tilde{g}[m]e^{-j\theta m}$ and $w[t]=\tilde{w}[t]e^{-j\theta t}$, and wherein effective transmitted symbol $\tilde{a}[t]$ is $$\frac{\pi}{8}$$

rotates, training symbol part a[t] is a binary phase shift keying (BPSK) (±1) signal even for 8 phase shift keying (8PSK), ã[t] is a complex signal due to consecutive $$\frac{\pi}{8}$$

rotations, $\tilde{r}[t]$ is a received signal before phase de-rotation, L is a number of channel taps minus 1, $\tilde{h}[l]$ is a channel of a user, $\tilde{g}[m]$ is a channel of an interference user, $\tilde{w}[t]$ is noise and other interference, r[t] is a received signal after de-rotation, ã[t] is an equivalent transmit signal after phase de-rotation, h[l] is an equivalent channel of a user after phase de-rotation, g[m] is an equivalent channel of an interference user after phase de-rotation, and w[t] is noise and other interference after phase de-rotation.

6. The IC processor of claim 1, wherein each of the plurality of MIC filter estimation processors is configured to perform temporal interference whitening by determining $p_i$ and $h_{res,i}$ as solutions to $$\min_{p,h_{res}} \sum_{t \in TS} (p^T r_t - h_{res}^T a_{t-k_0})^2,$$

wherein $k_0$ is an equalizer delay, $h_{res}$ is of length $2(Q_d+1)$, and p is of length $M(Q_p+1)$ for temporal interference whitening, TS is a training sequence, t and T are integers, r[t] is a received signal after de-rotation, and training symbol part a[t] is a binary phase shift keying (BPSK) (±1) signal even for 8 phase shift keying (8PSK).

7. The IC processor of claim 1, wherein each of the plurality of MIC filter estimation processors is configured to perform spatial interference whitening by selecting a B×B interference whitening matrix $P_S=R_{ee}^{-1/2}$, wherein $R_{ee}$ is estimated by training symbols (TS) as follows:

$$R_{ee} = E[e_T[t]e_T[t]^T] \approx \frac{\sum_{t \in TS}(y_T[t] - H_{res,T}a_t)(y_T[t] - H_{res,T}a_t)^T}{|TS|},$$

where $$e_T[t] := \begin{bmatrix} e_1[t] \\ e_2[t] \\ \vdots \\ e_B[t] \end{bmatrix},$$

t and T are integers, $y_T[t]=H_{res,T}a_t+e_r[t]$, and a[t] is a binary phase shift keying (BPSK) (±1) signal even for 8 phase shift keying (8PSK).

8. The IC processor of claim 3, wherein the phase-rotated MLSE processor is configured to process a burst in two parts by processing a left part of the burst from training symbols from a middle of the burst to a left of the burst, and process a right part of the burst from the training symbols from the middle of the burst to a right of the burst.

9. The IC processor of claim 3, wherein the phase-rotated MLSE processor is configured to determine a maximum likelihood sequence estimation by solving $$\operatorname*{argmin}_{\tilde{a}} \sum_{t} \left\| y[t] - \sum_{l=0}^{Q_d} H_{res}[l] \begin{bmatrix} \tilde{a}_I[t-l] \\ \tilde{a}_Q[t-l] \end{bmatrix} \right\|^2, \text{ wherein}$$

residue error e[t] is an independent identically distributed (i.i.d.) additive white Gaussian noise (AWGN) process, t and l are integers, $y[t]:=h_{res}^T a_t+e[t]$, a[t] is a binary phase shift keying (BPSK) (±1) signal even for 8 phase shift keying (8PSK), $Q_d$ is an integer for determining a length of a channel, and $\tilde{a}_I[t-l]$ and $\tilde{a}_Q[t-l]$ are equivalent transmit signals after phase de-rotation for a real part of a complex signal, and an imaginary part of a complex signal, respectively.

10. A method of combining channels of a de-rotated signal by an interference cancelation (IC) processor, comprising:

generating an effective channel $h_{res,i}$ and an estimated filter $p_i$ by each of a plurality of mono interference cancellation (MIC) filter estimation processors, wherein each of the plurality of MIC filter estimation processors includes a different equalizer offset $k_0$ and includes an input connected to a first input of the IC processor for receiving a de-rotated signal;

filtering, by a plurality of filters, the generating effective channels $h_{res,i}$ of each of the plurality of MIC filter estimation processors;

multiplying, by a plurality of multipliers, each of the filtered effective channels $h_{res,i}$ of the plurality of filters by one of a plurality of weights; and generating, by a branch combiner, a combined residual channel $H_{res}$ and a projected output y of the de-rotated signal.

11. The method of claim 10, further comprising de-rotating, by a de-rotation processor, a received signal, including an input for receiving a signal, and an output connected to the input of the IC processor.

12. The method of claim 10, further comprising generating, by a phase-rotated maximum-likelihood sequence estimation (MLSE) processor, a hard decision of the combined residual channel $H_{res}$ and the projected output y, and a soft decision of the combined residual channel $H_{res}$ and the projected output y.

13. The method of claim 11, wherein the received signal is phase shift keying (PSK) modulated that includes interference that is Gaussian minimum shift keying (GMSK) modulated.

14. The method of claim 11, wherein de-rotating, by the de-rotation processor, a received signal is comprised of phase de-rotating the received signal by $$\theta = \frac{\pi}{2}$$

as follows:

$$r[t] = \tilde{r}[t]e^{-j\theta t} = \sum_{l=0}^{L}\tilde{h}[l]e^{-j\theta l}a[t-l]e^{j(\varphi-\theta)(t-l)} + \sum_{m=0}^{L}\tilde{g}[m]e^{-j\theta m}b[t-m]+\tilde{w}[t]e^{-j\theta t}, \text{ wherein}$$

$$r[t] = \sum_{l=0}^{L} h[l]\tilde{a}[t-l] + \underbrace{\sum_{m=0}^{L} g[m]b[t-m] + w[t]}_{n[t]},$$

wherein
$\tilde{a}[t]=a[t]e^{j(\varphi-\theta)t}$, $h[l]=\tilde{h}[l]e^{-j\theta l}$, $g[m]=\tilde{g}[m]e^{-j\theta m}$ and $w[t]=\tilde{w}[t]e^{-j\theta t}$, and wherein effective transmitted symbol $\tilde{a}[t]$ is $$\frac{\pi}{8}$$

rotated, and training symbol part a[t] is a binary phase shift keying (BPSK) (±1) signal even for 8 phase shift keying (8PSK), and $\tilde{a}[t]$ is a complex signal due to consecutive $$\frac{\pi}{8}$$

rotations $\tilde{r}[t]$ is a received signal before phase de-rotation, L is a number of channel taps minus 1, $\tilde{h}[l]$ is a channel of a user, $\tilde{g}[m]$ is a channel of an interference user, $\tilde{w}[t]$ is noise and other interference, r[t] is a received signal after de-rotation, $\tilde{a}[t]$ is an equivalent transmit signal after phase de-rotation, h[l] is an equivalent channel of a user after phase de-rotation, g[m] is an equivalent channel of an interference user after phase de-rotation, and w[t] is noise and other interference after phase de-rotation.

15. The method of claim 10, further comprising performing, by each of the plurality of MIC filter estimation processors, temporal interference whitening by determining $p_i$ and $h_{res,i}$ as solutions to $$\min_{p,h_{res}} \sum_{t\in TS} (p^T r_t - h_{res}^T a_{t-k_0})^2,$$

wherein $k_0$ is an equalizer delay, $h_{res}$ is of length $2(Q_d+1)$, and p is of length $M(Q_p+1)$ for temporal interference whitening, TS is a training sequence, t and T are integers, r[t] is a received signal after de-rotation, and training symbol part a[t] is a binary phase shift keying (BPSK) (±1) signal even for 8 phase shift keying (8PSK).

16. The method of claim 10, further comprising performing, by each of the plurality of MIC filter estimation processors, spatial interference whitening by selecting a B×B interference whitening matrix $P_S=R_{ee}^{-1/2}$, wherein $R_{ee}$ is estimated by training symbols (TS) as follows:

$$R_{ee} = E[e_T[t]e_T[t]^T] \approx \frac{\sum_{t\in TS}(y_T[t] - H_{res,T}a_t)(y_T[t] - H_{res,T}a_t)^T}{|TS|},$$

where $$e_T[t] := \begin{bmatrix} e_1[t] \\ e_2[t] \\ \vdots \\ e_B[t] \end{bmatrix},$$

t and T are integers, $y_T[t]=H_{res,T}a_t+e_T[t]$, and a[t] is a binary phase shift keying (BPSK) (±1) signal even for 8 phase shift keying (8PSK).

17. The method of claim 12, further comprising processing, by the phase-rotated MLSE processor, a burst in two parts by processing a left part of the burst from training symbols from a middle of the burst to a left of the burst, and process a right part of the burst from the training symbols from the middle of the burst to a right of the burst.

18. The method of claim 12, further comprising determining, by the phase-rotated MLSE processor, a maximum likelihood sequence estimation by solving $$\underset{\tilde{a}}{\operatorname{argmin}} \sum_{t} \left\| y[t] - \sum_{l=0}^{Q_d} H_{res}[l]\begin{bmatrix} \tilde{a}_I[t-l] \\ \tilde{a}_Q[t-l] \end{bmatrix} \right\|^2,$$

wherein residue error e[t] is an independent identically distributed (i.i.d.) additive white Gaussian noise (AWGN) process, t and l are integers, $y[t]:=h_{res}^T a_t+e[t]$, a[t] is a binary phase shift keying (BPSK) (±1) signal even for 8 phase shift keying (8PSK), $Q_d$ is an integer for determining a length of a channel, and $ã_I[t-l]$ and $ã_Q[t-l]$ are equivalent transmit signals after phase de-rotation for a real part of a complex signal, and an imaginary part of a complex signal, respectively.

19. A method of manufacturing a semiconductor device, comprising:

forming the semiconductor device as part of a wafer or package that includes a plurality of mono interference cancellation (MIC) filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$;

a plurality of filters, wherein each of the plurality of filters includes an input connected to the output of one of the plurality of MIC filter estimation processors, and an output;

a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal; and testing the semiconductor device, wherein testing of the semiconductor device is performed using at least one electrical to optical converter, at least one optical splitter that splits an optical signal into at least two optical signals, and at least one optical to electrical converter.

20. A method of constructing an integrated circuit, comprising:

generating a mask layout for a set of features for a layer of the integrated circuit, the mask layout having standard cell library macros for:

a plurality of mono interference cancellation (MIC) filter estimation processors, wherein each of the plurality of MIC filter estimation processors includes a different equalizer offset $k_0$ and includes an input connected to a first input of the IC processor for receiving a de-rotated signal, and a first output that provides an effective channel $h_{res,i}$ and an estimated filter $p_i$;

a plurality of filters, wherein each of the plurality of filters includes an input connected to the output of one of the plurality of MIC filter estimation processors, and an output;

a plurality of multipliers, wherein each of the plurality of multipliers includes a first input connected to the output of one of the plurality of filters, a second input for receiving a weight, and an output; and a branch combiner including a plurality of inputs connected to the outputs of the plurality of multipliers, a first output connected to a first output of the IC processor for providing a combined residual channel $H_{res}$, and a second output connected to a second output of the IC processor for providing a projected output y of the de-rotated signal;

disregarding relative positions of the macros for layout design rule compliance during generation of the mask layout;

monitoring the relative positions of the macros for layout design rule compliance after disregarding the relative positions;

upon detection of layout design rule noncompliance of the macros, generating an adapted mask layout by adapting the noncompliance macros for layout design rule compliance;

generating a mask according to the adapted layout with the set of features for the layer of the integrated circuit; and manufacturing the integrated circuit layer according to the mask.

* * * * *